(No Model.)
E. T. STARR.
ENVELOPE FOR PROTECTING GRAPES WHILE MATURING.
No. 383,327. Patented May 22, 1888.
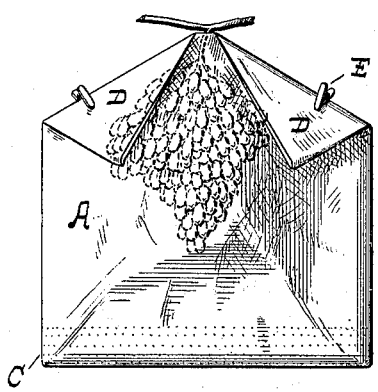
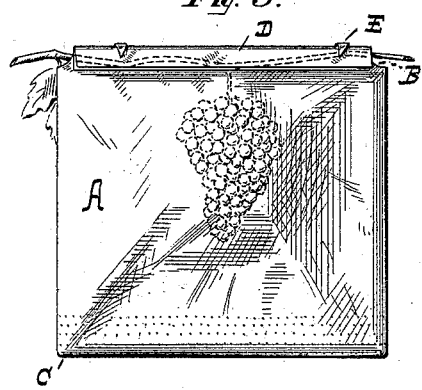
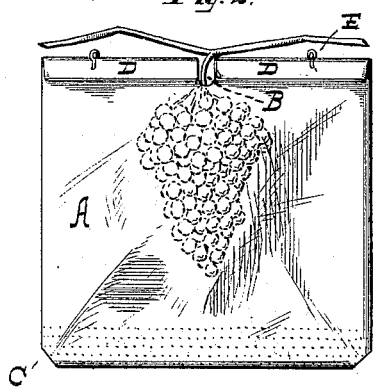
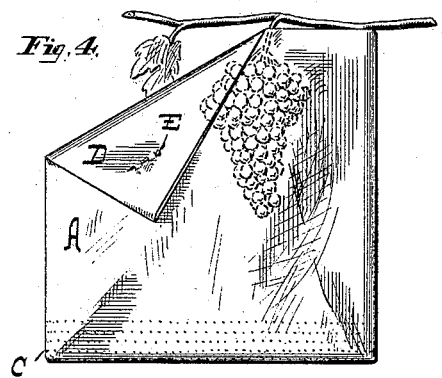
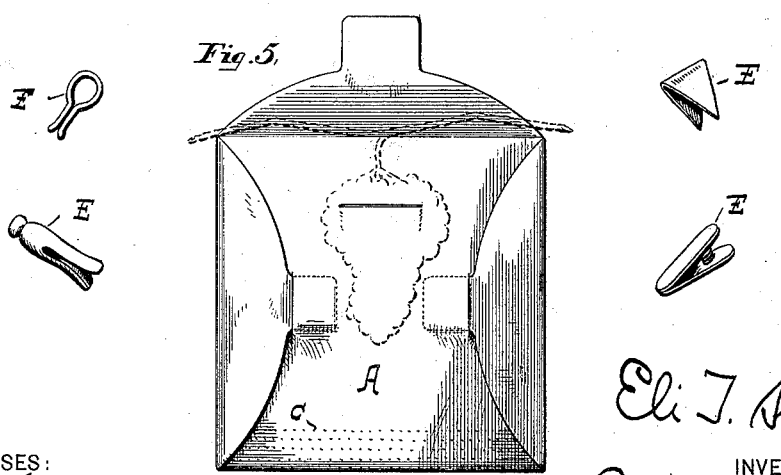
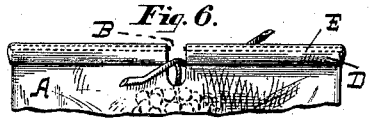
WITNESSES:
W. H. Ferry.
A. E. Paige.
Eli T. Starr,
INVENTOR.
By his Attorney
John Jolley

UNITED STATES PATENT OFFICE.

ELI T. STARR, OF PHILADELPHIA, PENNSYLVANIA.

ENVELOPE FOR PROTECTING GRAPES WHILE MATURING.

SPECIFICATION forming part of Letters Patent No. 383,327, dated May 22, 1888.

Application filed January 4, 1888. Serial No. 259,798. (No model.)

*To all whom it may concern:*

Be it known that I, ELI T. STARR, a citizen of the United States, residing in the city and county of Philadelphia, in the State of Pennsylvania, have invented a new and useful Envelope for Protecting Grapes while Maturing, of which the following is a specification.

In the drawings, Figure 2 represents a preferred form of my covering, shown applied to a cluster of grapes, and Figs. 1, 3, 4, 5, and 6 are modified plan views of the same.

My invention embraces the application of a water-proof covering to fruits while maturing, and particularly to grapes, for protecting the same from insects, mildew, rot, and other attendant disadvantages to exposed fruits, of means for permitting the escape of any water that may enter the covering, and also of means for admitting adequate light to the fruit for its perfection, and of providing means for adjusting and securing the covering above and over the fruit, all as hereinafter more fully described.

In the drawings, A is the covering, made in the form of a bag of parchment, parchment-paper, paper treated with paraffine, or of other suitable translucent water-proof material.

B are grooves or channels cut at the center of the top edges or corners of the covering for its better adjustment about the stem of the fruit or over the branch from which the fruit is suspended.

C are perforations or openings in the bottom and sides of the covering to permit the escape therefrom of any water that may enter the same.

D are the top edges or corners of the covering turned down or folded upon itself to prevent the entrance of insects and water to the fruit, and E are clamps, pins, wire, or other suitable fastening device, to secure the folded portions in place, to close the open end of the covering, and to prevent the covering from falling or being blown from the fruit.

In the practice of my invention I provide a covering made of parchment, parchment-paper, paper treated with paraffine, or of other suitable translucent water-proof material and of any desired contour, having perforations or openings in its bottom or side portion, or in both bottom and side portions, to permit the escape therefrom of any water that may enter the covering. This covering is adjusted over and above the fruit, its open upper end closed and secured by clamps, pins, wire, or other suitable fastening device—that is to say, when it is desired to secure the covering about the stem of the fruit, the top corners thereof are, after adjustment, turned down or folded upon themselves and secured in place with clamps, pins, or in any convenient manner—as, for instance, as shown in Fig. 1 in the drawings; or, as shown in Fig. 2, the covering made as above described is, in addition, provided with grooves or channels cut in its sides at the center of the top edges thereof and adapted to receive the stem of the fruit, and the top edges turned down or folded upon themselves and secured in place, as described; or, as shown in Fig. 3, the covering may be provided with grooves or channels cut at its top corners to permit it to be adjusted over the branch from which the fruit is suspended, and its top edges then turned down or folded upon themselves and secured in place, as described; or, as shown in Fig. 6, the covering may be constructed with grooves or channels cut in its sides at the center of its top edges and having its top edges turned down and secured over a wire, strip of lead, or like article, said covering adapted to be adjusted over the fruit and above the branch from which the fruit is suspended, and the top edges gathered together at the center, closing the opening, and secured by means of said wire, strip of lead, or like article; or a wire may be sewed in the body of the covering below its top edges for the same purpose, the whole construction and manner of adjusting and securing the covering about, above, and over the fruit tending to effectually protect the fruit from insects, mildew, rot, and other attendant disadvantages to exposed fruits, at the same time providing means for the escape of any water that may enter the covering, and of admitting adequate light to the fruit for its perfection.

A covering made of parchment, parchment-paper, paper treated with paraffine or of other suitable translucent water-proof material, transmits a mellow light to the fruit, and I have found that fruit protected in accordance with my invention matures perfectly, and great losses to the crop, by insects, mildew, rot, and other attendant disadvantages to exposed fruits, thereby saved. I have also found that grapes protected in accordance with my invention, when fully matured are sweeter and the skin less tough, and in "white grapes," so called, the skin is of a delicate shade of green and without blemish, and less tough than in exposed grapes, and the grapes sweeter.

Grooves or channels may be cut at the top corners or in the sides of the covering at the center of the top edges thereof for the better adjustment of the covering to the branch from which the fruit is suspended, or to the stem of the fruit direct. For the purpose of drainage, instead of perforating the bag or covering the bottom corners only of the bag or covering may be cut off.

The inner sides of the covering at its top edges may, if desired, be coated with an adhesive to close the open end of the covering after it has been adjusted over the fruit.

Having now described fully the bag or covering I contemplate using and the manner of adjusting and securing the same over fruit, I desire to state that many details of construction as respects both the covering and the manner of adjusting and securing the same may of course be adopted without departure from my invention. Thus, for instance, a covering may be constructed with its top edges closed part way along its length, so that when it is adjusted over the fruit but one corner will require fastening, as shown in Fig. 4 in the drawings, or the covering may be constructed in envelope form with tongues on its flaps adapted to enter slits or openings for the same in the body of the covering and secure the parts together, as shown in Fig. 5; or the flaps may be secured to the body of the covering with an adhesive, or the covering may be made in the form of a square bag or ordinary bag of commerce with or without the perforations or openings, and with or without the grooves or channels, and after being adjusted over the fruit have its top edges turned down or folded upon themselves and secured in place with clamps, pins, or other suitable fastening device, or have its top edges gathered together at the center and fastened with wire, string, clamp, pin, or in any convenient manner; and other minor and immaterial variations, both in construction and manner of adjusting and securing the covering above and over the fruit, be made without departing from the actual invention.

Having thus described my invention, I claim—

1. A device for protecting fruit while maturing, consisting of an envelope of translucent water-proof material provided with drainage-ports, and with means for securing its open end when closed around the fruit, substantially as described.

2. The device for protecting fruit while maturing, consisting of the envelope A, of translucent water-proof material, having its lower corners cut off to provide drainage-ports, and provided with devices for securing its open end when closed around the fruit, substantially as described.

In testimony whereof I have hereunto signed my name this 12th day of December, A. D. 1887.

ELI T. STARR.

In presence of—
SAMUEL E. STARR,
R. WALTER STARR.